March 18, 1958 — R. L. ESKEN — 2,826,819
GAUGING DEVICE
Filed Feb. 25, 1955 — 2 Sheets-Sheet 1
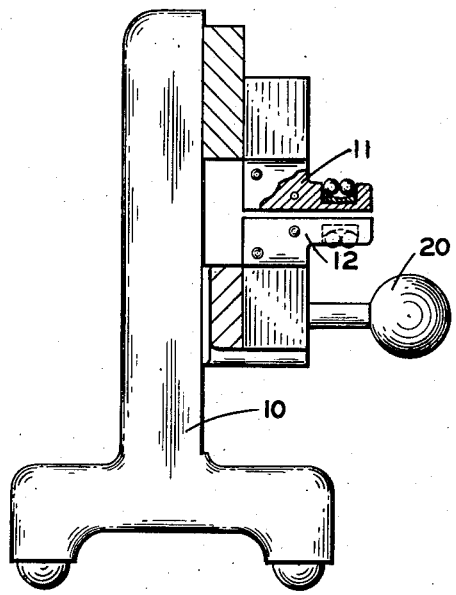
Fig-2
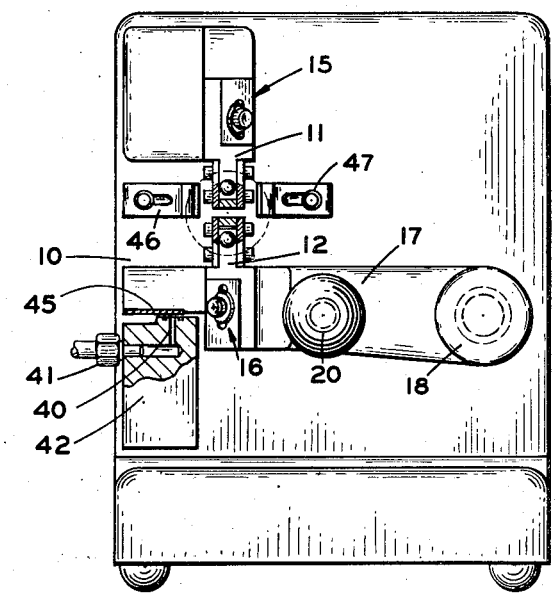
Fig-1
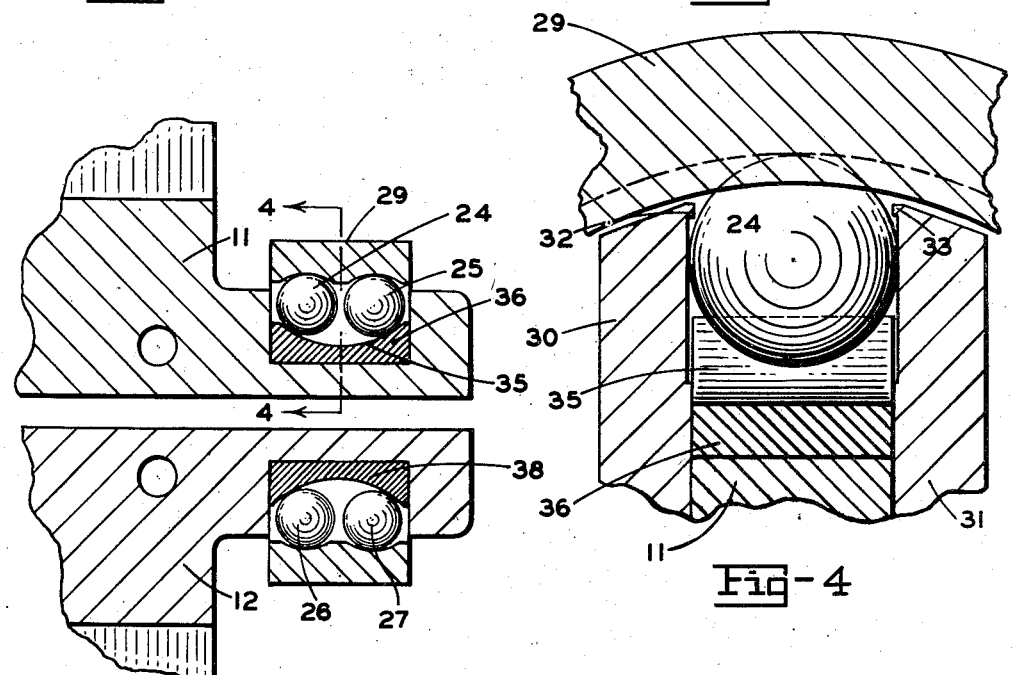
Fig-3
Fig-4
INVENTOR.
Robert L. Esken
BY Edward T. Noé Jr.
atty.

March 18, 1958 R. L. ESKEN 2,826,819
GAUGING DEVICE
Filed Feb. 25, 1955 2 Sheets-Sheet 2
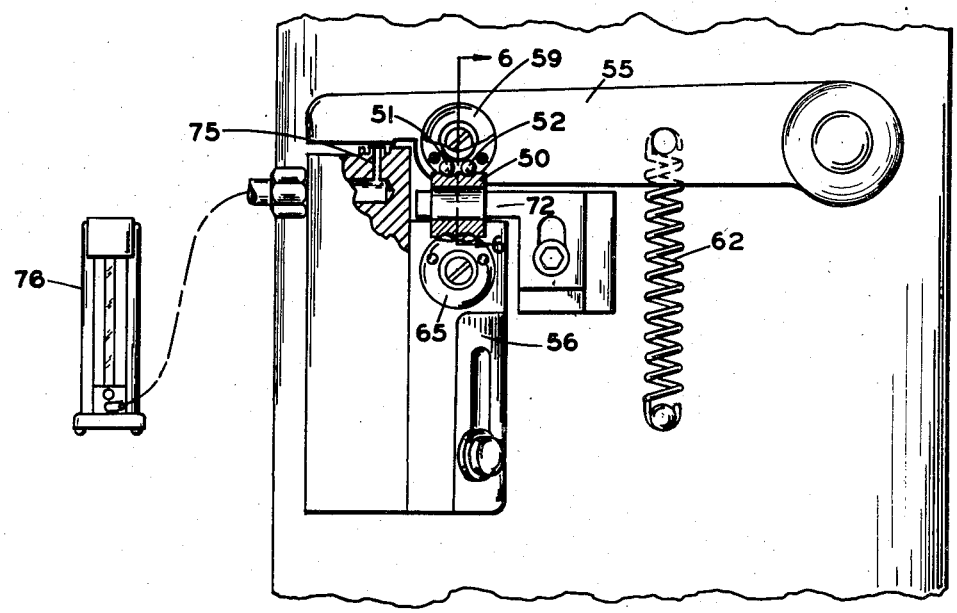
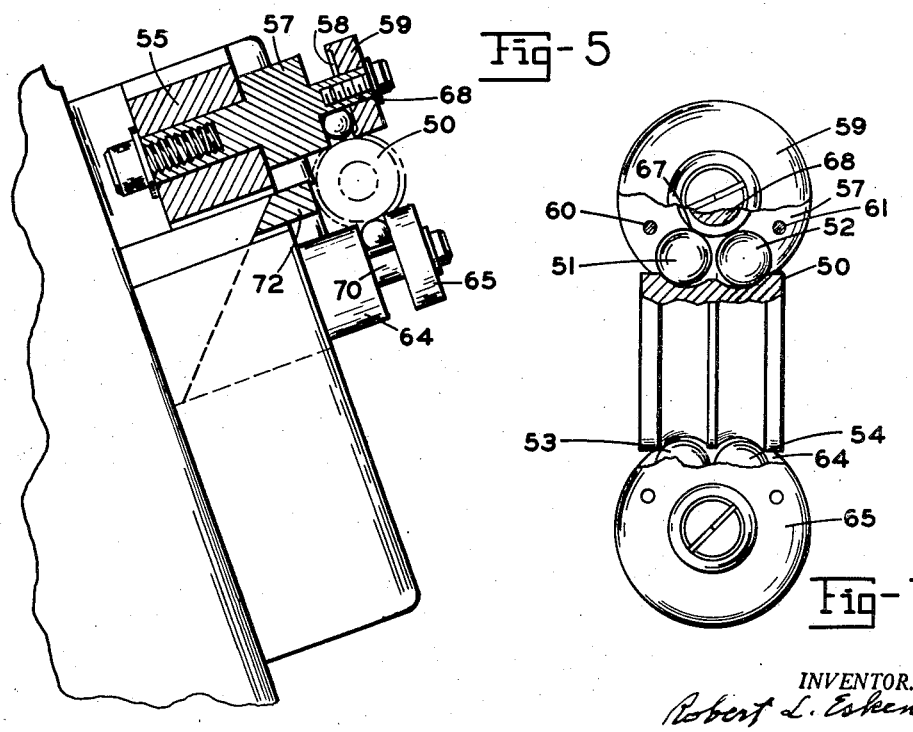
INVENTOR.
Robert L. Esken
BY Edward J. Roip
atty.

United States Patent Office 2,826,819
Patented Mar. 18, 1958

2,826,819

GAUGING DEVICE

Robert L. Esken, Dayton, Ohio, assignor, by mesne assignments, to The Sheffield Corporation, a corporation of Delaware Application February 25, 1955, Serial No. 490,568

11 Claims. (Cl. 33—174)

This invention relates to gaging apparatus and more specifically it relates to an improved apparatus for gauging the dimensional characteristics of the raceways of a double row ball bearing.

In gauging the inner or outer ring or race of a precision double row ball bearing for selective assembly with other bearing components, interrelated dimensional characteristics of the raceways must be considered. These dimensions include the raceway diameters as measured across the center of the bearing race, the raceway radii and the relative axial spacing of the raceways or the "straddle."

It is an object of the present invention to provide an apparatus for gauging the dimensional characteristics of part surfaces such as the raceways of a double row bearing race, the apparatus being simple in construction and operation and useful for accurate response in a single gaging operation to those raceway dimensions which cooperate with other bearing components in an assembled bearing.

It is a further object to provide such an apparatus wherein cooperating gauging members or supports are carried for relative movement into association with the raceways of a double row bearing race and are relatively positioned in gauging in accordance with the axial spacing or "straddle" between the raceways and the dimensional characteristics of the raceways themselves, gauging means being provided cooperating between the members and responsive to the dimensional characteristics of the raceways which determine the cooperation of the raceways with other components of an assembled bearing.

It is a further object to provide such an apparatus wherein each gauging member carries and retains a pair of balls for engagement, one with each of the raceways at opposite sides of the race, the extent of each pair of balls beyond the associated member being varied in accordance with the relative axial spacing of the balls along the bearing axis while in engagement with the raceways, whereby the gauging members assume limited relative positions determined by both the raceway dimensions and the axial spacing between the raceways along the race.

It is a further object to provide such an apparatus wherein each pair of balls engages an inner cam surface having a curvature centered at the intersection of contact angles of the adjacent raceways of a nominal race whereby the balls are urged in gauging against the raceways at contact points and under substantially the same conditions as occur in the assembled bearing.

It is a further object to provide such an apparatus wherein gauging means cooperate between the gauging members or supports, the gauging means comprising a fluid leakage orifice and an opposed orifice controlling surface whereby the leakage from the orifice is controlled by the dimensional characteristics of the raceways.

Other objects and advantages will be apparent from the following description, the appended claims, and the accompanying drawing in which, Figure 1 is a view of the forward face of an instrument for gauging outer bearing rings or races and embodying the present invention, shown in partial section, Figure 2 is an end view, also in partial section, of the instrument in Figure 1, Figure 3 is an enlarged detail of the gaging members or supports of Figure 2, Figure 4 is a sectional view of the retaining structure for the gauging balls taken on line 4—4 of Figure 3, Figure 5 is a fragmentary view of a second embodiment of this invention provided for gauging the dimensional characteristics of an inner bearing race, Figure 6 is a side view of the instrument in partial section along line 6—6 of Figure 5, and Figure 7 is an enlarged detail of this second embodiment.

The apparatus of the present invention is one which is provided for simultaneously gauging those inter-related dimensions of a part which determine its cooperation with other parts in an assembled unit and provides a single response indicative of these characteristics. The critical dimensions of the raceways of a double row ball bearing race include the diameter of each raceway measured across the center of the race, the raceway radii, and the axial spacing or "straddle" of the raceways along the axis of the race. The particular instruments illustrated for the purpose of disclosing the present invention are responsive to these dimensions of an outer or an inner race of a double row bearing.

Gauging members or supports are provided which are relatively moveable toward and from opposite sides of the race being gauged. If a pair of gauging members are provided they are relatively moveable along a line substantially diametral to the race and toward and from diametrically opposite sides thereof. Each of the supports carries a pair of gauging balls, one for engagement with each of the raceways at one side of the race. Because of this, the supports will be relatively positioned in accordance with the diameter of the raceways and the raceway radii. In the apparatus of the present invention when the balls are carried into engagement with the raceways, they are relatively spaced or spread along the axis of the race in accordance with the axial spacing or the "straddle" between the raceways which they engage. Each of the supports provides an inner surface engaging the inner faces of the balls in such a manner as to vary the extent of the balls from the associated support in accordance with their axial spacing. This results in a further variation between the limited positions of the supports in accordance with the axial spacing between the raceways. Thus, the relative positions of the supports in gauging is determined by those inter-related characteristics which will determine the available ball space and the cooperation of the raceway with the other components of the bearing. A gauging means is provided responsive to the relative positions of the supports and to these characteristics.

The particular instrument shown in Figures 1 to 4 gauges outer bearing races and includes an integral base 10 upon which the other components of the apparatus are mounted. A first gauging support 11 is fixedly mounted on the base 10 in adjusted vertical position by means of a screw and slot arrangement indicated at 15. Immediately below the gauging support 11 a second gauging support 12 is adjustably mounted by a similar screw and slot arrangement 16 on a gauging arm 17 pivoted for swinging movement about the axis of a shaft 18 carried from the base 10. The gauging arm 17 can be manually swung about its pivot axis by means of a handle 20.

The upper support 11 carries a pair of gauging balls 24 and 25 provided for engagement with the raceways of the outer race. The lower support 12 similarly carries a pair of gauging balls 26 and 27. In practice, the handle 20 is raised to close the supports 11 and 12 toward one another and an outer bearing race, such as that indicated at 29 in Figure 3, is placed over the supports. When handle 20 is released the gauging arm 17 and support 12 will lower, urging the respective pairs of gauging balls 24, 25, 26 and 27 into engagement with the raceways at diametrically opposite sides of the race and the relative positions of the supports 11 and 12 will be determined by the dimensional characteristics of the raceways engaged.

Adjustable guide bars 46 and 47 are provided to aid in locating on the forward face of the instrument.

Each pair of gauging balls is carried for free rotation in its respective support and for free relative movement along the support substantially along the axis of the bearing race. Each set of balls is retained laterally by side plates, indicated at 30 and 31 in Figure 4. The side plates have inwardly extending projections as indicated at 32 and 33 cooperating with the outer portions of the balls to retain them within the support.

In the particular application illustrated in Figures 1 to 4, the inner surfaces of the pair of balls 24 and 25 is engaged by a curved surface 35 provided on an insert 36 in the support 11. The inner surfaces of balls 26 and 27 are similarly engaged by a curved surface 38 on an insert within the support 12. The surfaces 35 and 38 are similarly formed and the surface 35, for example, is arcuate about a center at the vertex of the contact angles of the balls in a nominal bearing race. In the specific illustrated application, because this vertex would be outside the bearing, the bearing is described as having a "diverging" contact angle. This invention is also applicable to gauging components of a bearing having a "converging" contact angle. The surfaces 35 and 38 will urge the gauging balls into contact with the raceways at the proper angle and at the proper contact points.

As the gauging balls 24, 25, 26 and 27 are urged into engagement with the raceways, their relative spacing within their respective supports and along the axis of the bearing race will be determined by the axial spacing of the raceways themselves, or the raceway "straddle." For example, if the balls are spread from the positions they assume in Figure 3, they will ride upward on the curved surfaces 35 and 38 and will extend further from the adjacent surfaces of their respective supports. It will accordingly be seen that the relative positions of the supports 11 and 12 in gauging will be determined not only by the diameter of the raceways, the raceway radii, but also by the "straddle" distance therebetween.

The relative position of the supports 11 and 12 at their limited relative movement while in engagement with the raceways of the race 29, is gaged in order to determine the dimensional characteristics of the raceways, of the outer race. While other suitable gauging means can be employed, in the particular application illustrated, air leakage type gauging structure is utilized. A fluid leakage orifice 40 connected through a coupling 41 to a source of air under pressure and an air gauge, opens through the upper surface of a block 42 mounted on the base 10 at a fixed disposition relative to the support 11. An opposed orifice controlling surface 45 is carried by the outer end of the pivotally mounted gauging arm 17 and is positioned thereby to control the amount of fluid leaking through the orifice 41 in accordance with the relative positions of the supports 11 and 12. An associated gauging instrument can be suitably calibrated and, for example, can be calibrated in terms of inner races which have been previously gauged through a similar operation and placed into classified groups.

The shorter the "straddle" distance provided by the raceways of the race 29 the greater will be the ball space available. Ignoring the other dimensional characteristics of the raceways for the moment, as the "straddle" distance increases, the pairs of balls 24, 25 and 26, 27 will spread apart, ride upward on their cooperating surfaces 35 and 38, and extend further outward of the supports 11 and 12. Thus, the limited relative positions of the supports 11 and 12 will occur in increasingly smaller relative displacements with increases in the "straddle" distance. Correspondingly the orifice controlling surface 45 will have a greater clearance relative to the orifice 40 and an increase in leakage will occur.

The larger the diameter of the bearing raceways measured across the center of an outer race, the larger the ball space, and increases in diameter will cause an increase in flow through orifice 40. The smaller the raceway diameters of the outer race, the less the ball space and the less the leakage through orifice 40. The greater the actual transverse radius of curvature of the raceways, the greater the ball space and as the balls correspondingly move toward each other the supports will move outward and increase the flow through the orifice.

It will accordingly be seen that those conditions which provide increase or decrease in the ball space in an assembled bearing are each indicated by a resultant increase or decrease in flow through the orifice 40 and the associated gauging instrument will accordingly respond with a single reading to these interrelated bearing dimensions.

The instrument of Figures 5 to 7 is one which applies the principles of the present invention to the gauging of an inner bearing race 50 which, in this instance, is to be utilized with the outer race 29 in an assembled bearing having a diverging contact angle. Pairs of gauging balls 51, 52 and 53, 54 are respectively carried by a pivotably mounted gauging arm 55 and an adjustable support 56. Arm 55 is resiliently biased downward by a tension spring 62.

The pair of gauging balls 51 and 52 are retained between a back plate 57 and a depression 58 in the rearward surface of retaining plate 59. The balls are freely rotatable and are free for relative movement but are loosely restrained by retaining pins 60 and 61 passing through retaining plate 59 and into back plate 57. The pair of balls 53, 54 on adjustable support 56 are similarly carried between a back plate 64 and a retaining plate 65.

A cylindrical surface 67 on a forward extension 68 of back plate 57 engages and urges the balls 51 and 52 into contact with the raceways at substantially the contact points and contact angles which occur in the assembled bearing. Balls 53 and 54 are similarly engaged and urged into engaging contact with the raceways by an extension 70 on back plate 64. During gauging a race is applied between the ball pairs to a position within the instrument limited by an adjustable locating bar 72. The gauging operation is the same as for the modification previously described and gauging arm 55 is positioned relative to support 56 in accordance with the raceway dimensions and the axial straddle therebetween. The leakage through orifice 75 will be determined by these interrelated raceway characteristics and indicated by a flow measuring instrument 76 of the column type. In such an exemplary system air under regulated pressure passes upward through an internally tapered transparent flow tube and to the orifice 75, positioning an indicating float along the length of the tube in accordance with the velocity of leakage through the orifice.

While the forms of apparatus herein described constitute preferred embodiments of the invention, it is to be understood that the invention is not limited to the precise forms herein disclosed, and that changes may be made therein without departing from the scope of the invention which is defined in the appended claims.

What is claimed is:

1. An apparatus for gauging the dimensional characteristics of the raceways of a double row ball bearing race, said apparatus comprising: a base, a plurality of gauging supports, means mounting said supports on said base for relative movement in gauging, a pair of raceway engaging balls carried by each support for engagement with the raceways at opposite sides of a race to be gauged, each pair of balls being carried for bodily movement relative to one another axially of a race supported in gauging position and arranged adjacent one another, one for engagement with each raceway of a race to be gauged, each support having a portion cooperating with the associated pair of gauging balls whereby the supports are relatively positioned when the balls engage the race during gauging in accordance with the raceway dimensions and the axial spacing between the raceways, and gauging means responsive to the relative position of the supports in gauging.

2. An apparatus for gauging the dimensional characteristics of the raceways of a double row ball bearing race, said apparatus comprising: a base, gauging supports on said base, means mounting said supports from said base for relative movement in gauging, a pair of raceway engaging balls carried by each support, each support including ball holding means out of which the associated pair of balls extends, one for engagement with each of the raceways of a race to be gauged and in which the balls are carried for free rotation and bodily movement relative to one another substantially along the axis of a bearing race supported in gauging position in accordance with the axial spacing of the engaged raceways, each of said holding means having an inner cam surface engaging the ball pair to vary the extent of the balls beyond the surface of the respective support in accordance with the relative spacing of the balls in the holding means, means in said apparatus for relatively urging said supports to limited relative positions as determined by the engagement of the pairs of balls with the raceways and the relative spacing of each pair of balls within its respective support, whereby the supports are relatively positioned in accordance with raceway dimensions and the axial spacing between the raceways, and gauging means cooperating between said supports and responsive to the relative positions thereof as determined by the dimensional characteristics of the raceways gauged.

3. An apparatus for gauging the dimensional characteristics of the raceways of the double row ball bearing race, said apparatus comprising: a base, gauging supports on said base mounting said supports from said base for relative movement toward and from opposite sides of a bearing race being gauged, a pair of raceway engaging balls for each support, each support including ball holding means out of which the associated pair of balls extends for engagement with the raceways of a race to be gauged and in which the balls are carried for free rotation and bodily relative movement substantially along the axis of a bearing race in gauging position in accordance with the axial spacing of the raceways, each of said holding means having an inner cam surface having a curvature centered at the intersection of the nominal contact angles of the adjacent raceways and engaging the inner ball surfaces to extend the balls relative to the respective support in accordance with the relative spacing of the balls in the retaining means, means in said apparatus for relatively urging said supports to limited relative positions as determined by the engagement of the pairs of balls with the raceways and the relative spacing of each pair of balls within its respective support, whereby the supports are relatively positioned in accordance with the raceway dimensions and the axial spacing between the raceways, and gauging means cooperating between said supports and responsive to the relative positions thereof and the dimensional characteristics of the raceways gauged.

4. An apparatus for gauging the dimensional characteristics of the raceways of a double row ball bearing race, said apparatus comprising: a base, a pair of supports, means adjustably fixing one of said supports on said base, means carrying the other of said supports for movement relative to the first support along a line substantially diametral to a bearing race being gauged, a pair of raceway engaging balls for each support, each support including holding means out of which the associated pair of balls extends for engagement with the raceways of a race to be gauged and in which the balls are carried for free rotation and bodily relative movement substantially along the axis of a bearing race supported in gauging position in accordance with the axial spacing of the engaged raceways, each of said holding means having an inner cam surface urging the balls into engagement with the races at a predetermined contact angle and operative to vary the extent of the balls relative to the respective support in accordance with the relative spacing of the balls in the holding means, means urging the movable support along its line of movement and relative to the fixed support to a limited position as determined by the engagement of the pairs of balls with the raceways and the relative spacing of each pair of balls within its respective support, whereby the supports are relatively positioned in accordance with the raceway dimensions and the axial spacing between the raceways, and gauging means cooperating between said supports and responsive to the relative positions therebetween in gauging.

5. An apparatus for gauging the dimensional characteristics of the raceways of a double row ball bearing race, said apparatus comprising: a base, a pair of supports, means adjustably fixing one of said supports on said base, means mounting the second of said supports on said base for movement relative to the first support whereby the supports are relatively moveable toward and from opposite sides of a bearing race being gauged, means urging the second support toward gauging position, a pair of raceway engaging balls for each support, each support including holding means out of which the associated pair of balls extends for engagement with the adjacent raceway surfaces of a race to be gauged and in which the balls are carried for free rotation and bodily relative movement substantially along the axis of a bearing race supported in gauging position in accordance with the axial spacing of the engaged raceways, each of said holding means having cam surface engaging the inner surfaces of the balls to urge the balls into engagement with the raceways and to vary the extent of the balls relative to the respective support in accordance with the relative spacing of the balls in the retaining means, said supports assuming relative positions in gauging as determined by the engagement of the respective pairs of balls with the adjacent raceway surfaces and the relative spacing of each pair of balls within its respective support, whereby the moveable support is positioned relative to the fixed support in accordance with the raceway dimensions and the axial spacing between the raceways, and gauging means cooperating between said supports and responsive to the relative positions therebetween in gauging and the dimensional characteristics of the raceways.

6. An apparatus for gauging the dimensional characteristics of the raceways of the double row ball bearing race, said apparatus comprising: a base, gauging supports, means mounting said supports from said base for relative movement toward and from opposite sides of a bearing race being gauged, resilient means relatively urging said supports toward gauging position, a pair of raceway engaging balls for each support, each support including ball holding means out of which the associated pair of balls extends for engagement with the adjacent raceway surfaces of a race to be gauged and in which the balls are carried for free rotation and bodily relative movement substantially along the axis of a bearing race supported in gauging position in accordance with the axial spacing of the engaged raceways, each of said holding means having an inner cam surface engaging the inner ball surfaces to urge the balls into contact with the raceways at a predetermined contact angle and to vary the extent of the balls relative to the respective holding means in accordance with the relative spacing of the balls, whereby the supports are relatively positioned in accordance with the raceway dimensions and the axial distance between the raceways, and a fluid leakage orifice controlled by the relative gauging position of said supports adapted for connection to a fluid gauging means.

7. An apparatus for gauging the dimensional characteristics of the raceways of an outer race of a double row ball bearing characterized by a diverging contact angle, said apparatus comprising: a base, a pair of gauging supports, means adjustably fixing one of said supports on said base, a gauging arm, said gauging arm being mounted on said base for pivoting movements, means adjustably mounting the second of said supports at the outer end of said gauging arm for swinging movements toward and from the fixed support along a line substantially diametral to a bearing race being gauged whereby the supports can be relatively expanded into gauging position, a pair of raceway engaging balls for each support, each support including ball holding means out of which the associated pair of balls extends for engagement with the raceways of a race to be gauged and in which the balls are carried for free rotation and the relative movements substantially along the axis of a bearing race supported in gauging position in accordance with the axial spacing of the raceways which they engage, each of said retaining means having an inner cam surface of concave contour engaging the balls to vary the extent of the balls in accordance with the relative spacing of the balls in the retaining means, said gauging arm and the pivotally carried support being urged away from said fixed support to limited relative positions as determined by the engagement of the pairs of balls with the respective raceway surfaces and the axial spacing of each pair of balls within its respective support, whereby the gauging arm is positioned in accordance with the raceway dimensions and the axial distance between the raceways, and gauging means cooperating between said gauging arm and said base and responsive to the relative positions therebetween in gauging and the dimensional characteristics of the raceways.

8. An apparatus for gauging the dimensional characteristics of the raceways of an inner race double row ball bearing characterized by a diverging contact angle, said apparatus comprising: a base, a pair of gauging supports, means adjustable fixing a first of said supports on said base, means pivotally mounting the second of said supports for relative movement toward and from the fixed support along a line substantially diametral to a bearing race being gauged whereby the supports are moved toward one another to gauging position, a pair of raceway engaging balls for each support, each support including ball holding means out of which the associated pair of balls extends for engagement with the adjacent surfaces of the raceways of a race to be gauged and in which the balls are carried for free rotation and relative movements substantially along the axis of a bearing race supported in gauging position in accordance with the axial spacing of the raceways engaged, each of said retaining means having an inner cam surface of convex contour, engaging the balls to vary the extent of the balls in accordance with the relative spacing of the balls in the holding means, means in said apparatus urging the pivotally mounted support toward the fixed support and to a limited position relative thereto as determined by the engagement of the pairs of balls with the adjacent raceway surfaces and the relative spacing of each pair of balls within its respective support, whereby the supports are relatively positioned in accordance with raceway dimensions and the axial spacing between the raceways, gauging means cooperating between said supports, said gauging means comprising a pair of cooperating gauging components comprising a fluid leakage orifice and an opposed orifice controlling surface, one of said components being fixedly mounted on said base and the other being carried by said pivotally mounted support whereby the orifice and opposing surface are relatively positioned in accordance with the dimensional characteristics of the raceways, said orifice being adapted for connection to a source of fluid under pressure and a gauge.

9. An apparatus for gauging dimensional characteristics of the raceways of a double row ball bearing race comprising a base, a plurality of gauging supports, means mounting said supports on said base on opposite sides of the axis of a race to be gauged and for relative movement toward and from one another transverse said axis in gauging, a pair of raceway engaging balls for each support, ball retaining means for each support loosely carrying the respective pair of balls, one for engagement with each raceway of a race, and for bodily floating movement generally axially of a race in gauging position, each retaining means including contact means urging each ball into positioning engagement with the respective raceway at a predetermined contact angle, and gauging means responsive to the relative positions of the supports in gauging.

10. An apparatus as set forth in claim 9 wherein said contact means provides a ball engaging surface having a curvature centered at the vertex of the nominal contact angle of the race being gauged.

11. An apparatus for gauging dimensional characteristics of the raceways of a double row ball bearing race comprising a base, a plurality of gauging supports, means mounting said supports on said base for relative movement toward and from the raceways of a race to be gauged and generally transverse the axis thereof, a pair of raceway engaging balls for each support, ball retaining means for each support carrying the respective pair of balls for simultaneous positioning engagement with the raceways in a common plane including the axis of the race being gauged, the balls of each pair being carried for free rotation and relative movement generally axially of a race in gauging position, each retaining means having inner cam surface means inclined relative to the race axis and engaging each ball to vary the extent of the balls in accordance with the relative ball positions as determined by the raceway spacing and dimensions, and gauging means responsive to the relative positions of the gauging supports.

References Cited in the file of this patent

UNITED STATES PATENTS

| 1,423,542 | Rockwell | July 25, 1922 |
| 1,550,671 | Brault | Aug. 25, 1925 |
| 2,024,020 | Aldeborgh | Dec. 10, 1935 |
| 2,246,485 | Aller | June 17, 1941 |
| 2,631,378 | Wynne | Mar. 17, 1953 |